Patented June 22, 1937

2,084,399

UNITED STATES PATENT OFFICE 2,084,399

POLYMERIZATION PROCESS

Glen M. Kuettel, Roselle, N. J., assignor, by mesne assignments, to E. I. du Pont de Nemours & Company, Wilmington, Del., a corporation of Delaware No Drawing. Application December 12, 1935, Serial No. 54,045

9 Claims. (Cl. 106—22)

This invention relates to a polymerization process and, more particularly, to the polymerization of esters of acrylic, methacrylic, and other alkacrylic acids to obtain colored polymers.

Cast resins obtained by the polymerization of monomeric acrylates and alkacrylates in molds, or the like, are ordinarily colored by dissolving a suitable dye in the liquid monomer and then subjecting the monomer to polymerizing conditions. In actual practice, many of the dyes which are otherwise satisfactory, are difficult or impossible to use in this manner because they exert a marked inhibiting effect upon the reaction of polymerization and thus unduly extend the time required for the production of polymer from monomer, or prevent formation of a substantially completely polymerized product altogether under ordinary circumstances. The inhibiting effect of such dyestuffs can be balanced by the addition of a polymerization catalyst but this is, in general, an unsatisfactory expedient since the catalyst is very likely to exert a destructive effect upon the dye itself and thus alter its color or even discharge it altogether. Heretofore there were no means of overcoming these disadvantages attendant upon the use of the many dyes having an inhibiting effect on the polymerization of these compounds.

It is an object of the present invention to provide a process of preparing colored polymers from monomeric acrylates and alkacrylates. A further object is to reduce the inhibiting effect of dyes upon the polymerization reaction without adopting the expedient of adding catalytic substances for this purpose. A still further object is to provide an economical and commercially feasible process of producing colored, massive cast polymers in which dyes tending to inhibit polymerization have been used for purposes of coloring.

The above objects are accomplished according to the present invention by dissolving the dye that tends to inhibit polymerization; in a flowable composition comprising a polymerized acrylate or alkacrylate dissolved in a monomeric acrylate or alkacrylate, and then subjecting said composition to polymerizing conditions until the monomeric acrylate or alkacrylate is substantially completely polymerized.

The solution of polymer and monomer can be formed either by dissolving a preformed polymer in the monomer in the desired proportions, or the liquid monomer may be subjected to polymerizing conditions, such as moderate heat, until it has passed through the induction period, i. e., that period during which the monomer must be subjected to polymerizing conditions before any polymer is apparently formed, and the viscosity of the liquid begins to rise, an evidence that polymer is being formed. In either case, the dye is then dissolved in the solution which, for convenience, must be flowable, and the solution is then subjected to polymerizing conditions to convert the monomer to polymer.

The present invention resides in the discovery that a dye which, when dissolved in monomer, will inhibit polymerization of the monomer under ordinary polymerizing conditions to a greater or lesser extent, will have no inhibiting effect, or a greatly reduced effect, if added to a solution of polymer in monomer. It has also been found that the dye may be added to monomer and then preformed polymer may be dissolved in the monomer to overcome the inhibiting effect of the dye; this latter procedure is substantially equivalent to dissolving the preformed polymer in monomer and then adding the dye.

In order to illustrate the invention, the following specific examples, in which the methyl ester of methacrylic acid is used, are given:

*Example 1.*—Monomeric methyl methacrylate was heated for 5 hours at 70° C. in an air oven. The monomer was thus subjected to partial polymerization, converting it from a mobile liquid into a syrup, due to the formation of some polymer. To 10 grams of this syrup was added the soluble dye Celliton Fast Blue Green B in the proportion of one part of dye to 6000 parts of syrup, by weight, and the heating was continued for 14 hours to complete the polymerization to the final solid resin. The total time for polymerization was thus 19 hours.

Under the same conditions 10 grams of the monomer in the absence of any dye required 18 hours for complete polymerization and another sample, having the dyestuff added to the monomer, required 25 hours. The inhibiting effect of the dye could be offset by the addition of benzoyl peroxide but only at the sacrifice of color which is changed thereby from green to an unattractive red hue.

*Example 2.*—Monomeric methyl methacrylate was heated for 4 hours at 70° C. in an air oven. To the syrup thus formed there were added dyes in the following proportions, by weight:

| | Parts |
|---|---|
| Syrup | 1000 |
| du Pont anthraquinone green G base | 0.008 |
| Oil yellow PHW | 0.04 |
| du Pont oil red | 0.04 |

The mixture was maintained at 70° C. until at the end of 3 days it was hard and substantially completely polymerized.

An equal amount of monomeric methyl methacrylate, to which the above dyes in the same proportions were added before the start of the polymerization, failed to polymerize more than partially in 12 days at 70° C. and was still a flowable liquid at the end of that time.

*Example 3.*—1400 grams of monomeric methyl methacrylate was heated in an air oven at 70° C. The flask was shaken frequently in order to prevent local heating due to the exothermicity of the polymerization reaction and in order to keep the liquid homogeneous. The relative viscosities of the liquid at the ends of periods of one hour were determined by timing the emptying of a 25 cc. pipette filled with samples taken from the flask and quickly chilled to 0° C. to check further polymerization. These viscosities, determined at 17° C., were as follows:

| Time of heating, hours | Time to empty pipette, seconds |
| --- | --- |
| 0 | 17.5 |
| 1 | 17.5 |
| 2 | 17.5 |
| 3 | 27.0 |
| 4 | 34.0 |
| 5 | 61.0 |

To each of three samples taken from the flask at the ends of 1, 2, and 3 hours, respectively, there was added 0.25%, by weight, of the dye Oil Yellow PHW. These samples were then heated further at 70° C. There was no evidence of further polymerization, if any had occurred prior thereto, in 120 hours.

To a sample taken from the flask at the end of 4 hours' heating, 0.25% of Oil Yellow PHW was added and the mixture heated at 70° C. After 24 hours the mass was polymerized to a stiff gel as compared to a period of 10 hours required to polymerize a similar sample not containing the dye. Samples taken after more than 4 hours' heating, to which 0.25% of Oil Yellow PHW was added, polymerized readily at 70° C. to a stiff gel in even shorter periods of time.

The above examples merely illustrate specifically how the invention may be carried out but those skilled in the art will appreciate the many variations in procedure, compositions, and the like, coming within the scope of the invention.

An important use of the invention is in the manufacture of cast, massive pieces of resin, the so-called "turnery" resins, and transparent resins for this purpose are particularly in demand. Accordingly, conditions will generally be selected that will give a flawless, transparent polymer, opaque fillers and the like which could be used as far as operation of the invention is concerned, being generally avoided, and the flowable compositions or syrups of monomer-polymer and soluble dye will be poured into molds to be converted into solid pieces of polymer of the desired shape. As those skilled in the art will know, the usual agenices for causing the polymerization reaction, such as heat and actinic light, can be used in this process.

As a practical matter, it will be found that it is usually more convenient to heat the monomer to give a viscous syrup, add the dye, and continue the heating without letting the syrup cool down, or, alternatively, make up a large quantity of syrup by partial polymerization of monomer, or dissolving polymer in monomer, to provide a stock supply of material that can be polymerized under relatively standardized conditions.

The invention is broadly applicable to the esters of acrylic and alkacrylic acids, and particularly the esters of methacrylic acids which are extremely valuable for use in turnery resins, but also to other alkacrylic acids as the ethacrylic acid, and other polymerizable derivatives of these acids as methacrylamide and methacrylnitrile. Among such esters may be mentioned the methyl, ethyl, propyl, butyl, and stearyl esters of acrylic and methacrylic acids, as well as mixtures thereof, or mixtures with polymerizable vinyl compounds, styrene, and the like. Obviously, where the monomer component is a mixture of these compounds, the final product will be an interpolymer. The esters which give, on polymerization, the polymers best suited for use as turnery resins will generally be used in the present process. Since it is a requisite of the present invention that the composition to which the dye is added, shall be a homogeneous flowable solution, the addition of a polymeric ester insoluble in monomer is to be avoided. For example, many of the polymeric poly-methacrylates, as glycol di-methacrylate, tend to be insoluble in monomer. However, the present invention is applicable to many of these poly-methacrylates because the monomeric poly-methacrylates can be partially polymerized to give homogeneous flowable compositions presumably containing dissolved polymer. Also, it will be understood that a polymeric mono-methacrylate may be dissolved in a monomeric poly-methacrylate to give a homogeneous flowable composition to which the dye may be added. Further, interpolymers including a poly-methacrylate may be soluble in monomer and hence can be dissolved in monomer to give a homogeneous flowable composition.

Where preformed polymer is added to monomer, the polymer may be the same or a different acrylate or methacrylate from the monomer since a homogeneous product will result. In this instance, however, a true interpolymer will not be formed. In this way, the property of the final product may be modified to give a product best adapted for the intended use.

While it is impossible to give the exact amount of polymer that should be used with monomer to overcome or greatly reduce the inhibiting effect of the dye, as a practical matter this presents no problem at all because it is advantageous to dissolve as much preformed polymer in monomer as can be done to still give a flowable composition, or, alternatively, to subject the monomer to polymerizing conditions until the viscosity of the liquid is built up as far as practical to still give a flowable composition. The greater the amount of polymer present in the monomer, the more will the inhibiting effect of the dye be overcome so that there is no upper limit on the proportion of polymer used as long as a flowable composition results. On the other hand, it is necessary to have a flowable composition as usually the composition will be poured into molds to give a cast resin and, even if used otherwise as in processes of polymerization in fine and coarse dispersions and in solvent and non-solvent liquid vehicles, processes which yield polymer in finely divided rather than massive form, it is still usually more convenient to have the composition in a flowable form.

The proportion of polymer in the flowable composition, according to the present invention, will generally be in the approximate range of 1–10%, by weight of the composition; rarely will this range be exceeded and usually a proportion close to the middle of the range will be employed. The polymerization inhibiting effect will vary depending on the particular dye used and the proportion used and as little as 1% polymer in the monomer will have a very definite result where the inhibiting effect to be overcome is weak. The use of less than 1% polymer would have little practical value unless an extremely small proportion of a dye, or a dye having only a very weak inhibiting effect, were being employed. As much as 10% polymer in the composition is advantageous provided the composition is still flowable; this depends upon the particular polymer and the monomer employed. It would not be usual to be able to employ appreciably more than 10% polymer and still obtain a composition that could be conveniently poured into molds, and the like.

The proportion of dye employed will depend upon the color effect desired. The dyes coming within the scope of this invention are those which are soluble in the monomeric ester used and which tend to inhibit polymerization. Among such dyes are the following:

Celliton Fast Blue Green B—Schulz—(Farbstoff Tabellen) 7th Ed. Vol. 2—P. 45;
du Pont Anthraquinone Green G base—Color Index No. 1078;
Oil Yellow PHW—1934 Year Book of the American Association of Textile Chemists & Colorists—P. 249;
du Pont Oil Red—Color Index No. 258;
Ionamine Blue B powder—Schulz—(Farbstoff Tabellen) 7th Ed. Vol. 1—P. 29;
Celanthrene Blue G—1934 Year Book of the American Association of Textile Chemists & Colorists—P. 218;
Oil Brown N—1934 Year Book of the American Association of Textile Chemists & Colorists—P. 247;
Special Scarlet—obtained by diazotizing paranitraniline and coupling with cresidine.

It will be observed that these dyes are of widely varying types and do not exhibit any chemical structure that might account for their characteristic inhibiting effect. No dye has been discovered that does not show this inhibiting effect in some degree. It is quite possible that some impurity contained in practically all dyes on the market accounts for the inhibiting effect, rather than the dye itself; however, this is immaterial to the present invention which resides not in the use of any particular class of dyes but applies to all dyes that are soluble in the monomeric ester and tend to inhibit polymerization. Exhaustive research has failed to reveal a single one of these inhibiting dyes whose inhibiting effect is not completely or largely overcome by the process of the present invention and, in view of the wide assortment of dyes tested, such as given above, it is believed, with reason, that the present invention is operative and useful with respect to any dye soluble in the monomeric ester used and tending to inhibit polymerization.

The present invention is not only applicable to the casting of massive pieces of polymer but may also be applied in connection with other processes of polymerization designed to prepare the polymeric ester in a form suitable for use as a raw material for plastic processes in general. Processes of polymerization in fine and in coarse dispersions and in solvent and non-solvent liquid vehicles, whereby the polymer is yielded in finely divided rather than massive form, may be used.

An advantage of the present invention is that it shortens radically the process of polymerizing the organic compounds of the type herein considered in the presence of soluble dyestuffs which have an inhibiting effect upon the polymerization. The present invention permits the use of many dyes which have been excluded heretofore from use in this manner because their inhibiting effect has been so strong as to extend the period of polymerization beyond commercial limits, or even to prevent substantially complete polymerization from taking place at all, while on the other hand, it has not been feasible to use the ordinary polymerization catalysts because of the effect of such catalysts on the dye. Thus the present invention extends very appreciably the assortment of dyes which can be used for the coloring of this type of resin and correspondingly enlarges the range of colors in which such resins can be produced commercially.

As many apparently widely different embodiments of this invention may be made without departing from the spirit and scope thereof, it is to be understood that the invention is not limited to the specific embodiments thereof except as defined in the appended claims.

I claim:
1. Process which comprises dissolving a dye that tends to inhibit polymerization, in a flowable composition comprising a compound from the group consisting of polymerized esters of acrylic and alkacrylic acids, dissolved in a compound from the group consisting of the monomeric esters of acrylic and alkacrylic acids, and subjecting said composition to polymerizing conditions until the monomeric ester is substantially completely polymerized.

2. Process which comprises dissolving a dye that tends to inhibit polymerization, in a flowable composition comprising a polymerized ester of methacrylic acid dissolved in a monomeric ester of methacrylic acid, and subjecting said composition to polymerizing conditions until the monomeric ester is substantially completely polymerized.

3. Process which comprises dissolving a dye that tends to inhibit polymerization, in a flowable composition comprising polymerized methyl methacrylate dissolved in monomeric methyl methacrylate, and subjecting said composition to polymerizing conditions until the monomeric methyl methacrylate is substantially completely polymerized.

4. Process which comprises subjecting a liquid composition comprising a compound from the group consisting of the monomeric esters of acrylic and alkacrylic acids, to polymerizing conditions until some polymerized ester is formed but the composition is still flowable, dissolving a dye that tends to inhibit polymerization, in the composition, and thereafter again subjecting said composition to polymerizing conditions until the monomeric ester is substantially completely polymerized.

5. Process which comprises subjecting a liquid composition comprising a monomeric ester of methacrylic acid to polymerizing conditions until some polymerized ester is formed but the composition is still flowable, dissolving a dye that tends to inhibit polymerization in the composition, and thereafter again subjecting said composition to polymerizing conditions until the monomeric ester is substantially completely polymerized.

6. Process which comprises subjecting a liquid composition comprising monomeric methyl methacrylate, to polymerizing conditions until some polymerized methyl methacrylate is formed but the composition is still flowable, dissolving a dye that tends to inhibit polymerization, in the composition, and thereafter again subjecting said composition to polymerizing conditions until the monomeric methyl methacrylate is substantially completely polymerized.

7. Process which comprises dissolving a dye that tends to inhibit polymerization, in a flowable composition comprising a compound from the group consisting of the polymerized esters of acrylic and alkacrylic acids, dissolved in a compound from the group consisting of the monomeric esters of acrylic and alkacrylic acids, pouring said flowable composition into a mold, and then subjecting said composition to polymerizing conditions until the monomeric ester is substantially completely polymerized and a solid body is formed.

8. Process which comprises dissolving a dye that tends to inhibit polymerization, in a flowable composition comprising a polymerized ester of methacrylic acid, dissolved in a monomeric ester of methacrylic acid, pouring said flowable composition into a mold, and then subjecting said composition to polymerizing conditions until the monomeric ester is substantially completely polymerized and a solid body is formed.

9. Process which comprises dissolving a dye that ends to inhibit polymerization, in a flowable composition comprising polymerized methyl methacrylate dissolved in monomeric methyl methacrylate, pouring said flowable composition into a mold, and then subjecting said composition to polymerization conditions until the monomeric methyl methacrylate is substantially completely polymerized and a solid body is formed.

GLEN M. KUETTEL.